United States Patent
Ohara et al.

(10) Patent No.: US 11,473,236 B2
(45) Date of Patent: Oct. 18, 2022

(54) SOIL-RESISTANT FIBER FABRIC AND METHOD FOR PRODUCING SAME

(71) Applicants: TB Kawashima Co., Ltd., Shiga (JP); Toyota Jidosha Kabushiki Kaisha, Aichi (JP)

(72) Inventors: Kohei Ohara, Shiga (JP); Takayuki Oishi, Shiga (JP); Tatsuya Fukui, Shiga (JP); Kyoko Hatta, Shiga (JP); Yoshiko Murata, Shiga (JP); Tokue Tsutsumi, Aichi (JP); Yuichi Miyake, Aichi (JP)

(73) Assignees: TB KAWASHIMA CO., LTD., Shiga (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 144 days.

(21) Appl. No.: 16/639,799

(22) PCT Filed: Oct. 11, 2018

(86) PCT No.: PCT/JP2018/037864
§ 371 (c)(1),
(2) Date: Feb. 18, 2020

(87) PCT Pub. No.: WO2019/078078
PCT Pub. Date: Apr. 25, 2019

(65) Prior Publication Data
US 2020/0248399 A1    Aug. 6, 2020

(30) Foreign Application Priority Data

Oct. 17, 2017   (JP) .............................. JP2017-200770

(51) Int. Cl.
*D06M 11/79*   (2006.01)
*D06M 15/256*   (2006.01)
(Continued)

(52) U.S. Cl.
CPC .......... *D06M 11/79* (2013.01); *D03D 15/283* (2021.01); *D06M 15/256* (2013.01);
(Continued)

(58) Field of Classification Search
CPC .. D06M 11/79; D06M 15/256; D06M 15/277; D06M 2200/11; D06M 2200/12;
(Continued)

(56) References Cited

U.S. PATENT DOCUMENTS

2009/0094954 A1*   4/2009   Nakayama ........... C09D 5/1618
428/327

FOREIGN PATENT DOCUMENTS

CN      104878592      9/2015
JP      S58004873      1/1983
(Continued)

OTHER PUBLICATIONS

Espacenet translation of JP-2011047085-A. (Year: 2011).*
(Continued)

*Primary Examiner* — Jeremy R Pierce
*Assistant Examiner* — Christine X Nisula
(74) *Attorney, Agent, or Firm* — Kirschstein, Israel, Schiffmiller & Pieroni, P.C.

(57) ABSTRACT

A soil-resistant fiber fabric having excellent water/oil repellency and excellent soil dirt resistance is obtained by fixing colloidal silica to a fiber fabric, and by subsequently treating the fiber fabric with a water/oil repellent fluorine compound, thereby having the water/oil repellent fluorine compound adhere to a surface of the fiber fabric.

4 Claims, 2 Drawing Sheets

(51) Int. Cl.
   *D06M 15/277*   (2006.01)
   *D06M 15/507*   (2006.01)
   *D03D 15/283*   (2021.01)
   *D06M 101/32*   (2006.01)

(52) U.S. Cl.
   CPC ........ *D06M 15/277* (2013.01); *D06M 15/507* (2013.01); *D06M 2101/32* (2013.01); *D10B 2331/04* (2013.01); *D10B 2401/021* (2013.01)

(58) Field of Classification Search
   CPC ............... D06M 11/77; D06M 15/643; D06M 2200/01; D10B 2401/021; D10B 2401/02; D10B 2401/022
   See application file for complete search history.

(56) References Cited

FOREIGN PATENT DOCUMENTS

| | | |
|---|---|---|
| JP | 2002210876 | 7/2002 |
| JP | 2003211569 | 7/2003 |
| JP | 2005220460 | 8/2005 |
| JP | 2006193849 | 7/2006 |
| JP | 2007162154 | 6/2007 |
| JP | 2007162154 A * | 6/2007 |
| JP | 2011047085 A * | 3/2011 |
| JP | 2011168905 | 9/2011 |
| JP | 2013053378 | 3/2013 |
| JP | 2017179650 A * | 10/2017 |

OTHER PUBLICATIONS

Espacenet translation of JP-2017179650-A. (Year: 2017).*
Espacenet translation of JP-2007162154-A. (Year: 2007).*
International Search Report in international application No. PCT/JP2018/037864 dated Dec. 11, 2018.

* cited by examiner

Fig. 2(a)

The case in which silica-based soil dirt preventing agent (23%) and fluorine-based water/oil repellent agent (6.7%) are applied by one-time processing

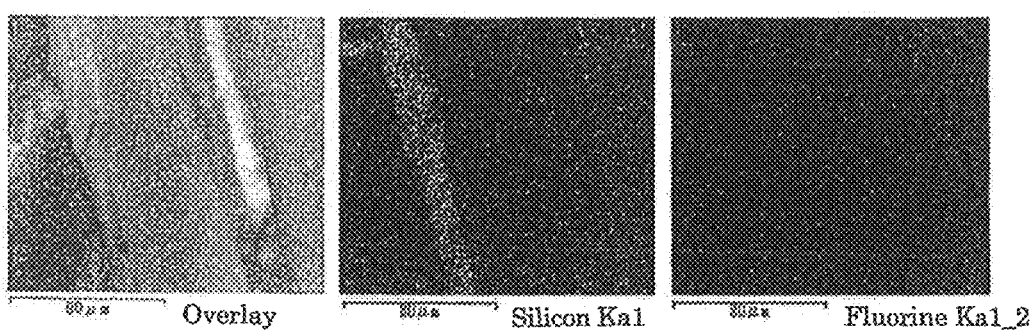

Overlay map: Silicon Kα1 , Fluorine Kα1_2 [Image]

Fig. 2(b)

The case in which silica-based soil dirt preventing agent (7%) + binder (3%) are applied at the first time, and fluorine-based water/oil repellent agent (2.5%+2.5%) is applied at the second time

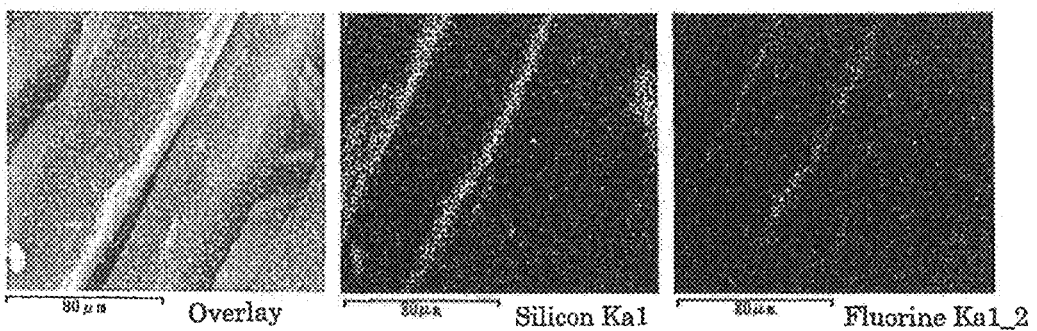

Overlay map: Silicon Kα1 , Fluorine Kα1_2 [Image]

SOIL-RESISTANT FIBER FABRIC AND METHOD FOR PRODUCING SAME

TECHNICAL FIELD

The present invention relates to a soil-resistant fiber fabric and a method for producing the fabric.

BACKGROUND ART

There have been disclosed several methods for preventing dirt from adhering to a fiber product or processing methods for making it easy to remove adhered dirt.

For example, Patent Document 1 below discloses a fiber fabric in which soil dirt entering the interior of fiber is easily removed by washing and recontamination hardly occurs, and a method for producing the same. However, water and oil repellency is not disclosed in Patent Document 1, so that the fiber fabric in Patent Document 1 is not suitable for aqueous dirt or oil dirt.

Further, Patent Document 2 below discloses a method for producing a skin material in which soil dirt is easily removed by simultaneously treating with a composition containing a hydrophilic fluorine-based compound, a water repellent fluorine-based compound and silica fine particles, and adhering the compositions to a surface of fiber fabric, and in which sebum dirt and the like can be easily removed by tubbing the skin material with water-containing fabric. However, since the silica fine particles are fixed to the surface in the production method described in Patent Document 2, there is a defect in oil repellency; and this method is not suitable for oils having low surface tension.

As described above, a method for imparting effective soil resistance to various dirt has not conventionally been known.

PRIOR ART DOCUMENT

Patent Documents

Patent Document 1: JP-A-2011-168905
Patent Document 2: JP-A-2013-053378

SUMMARY OF THE INVENTION

Problems to be Solved by the Invention

Accordingly, an object of the present invention is to provide a soil-resistant fiber fabric that solves the problems in the prior art and has excellent water and oil repellency and soil dirt resistance.

Means for Solving the Problems

The present inventors have found that it is possible to produce a soil-resistant fiber fabric having excellent water and oil repellency and soil dirt resistance by fixing a predetermined amount of colloidal silica to a fiber fabric and then treating the fiber fabric with a water and oil repellent fluorine compound to adhere the compound to a surface of the fiber fabric, and thus have completed the present invention.

That is, a method for producing a soil-resistant fiber fabric of the present invention includes fixing colloidal silica to the fiber fabric in a fixation amount of 1 to 6 $g/m^2$ using a binder resin; and then treating the fiber fabric with a water and oil repellent fluorine compound to adhere the water and oil repellent fluorine compound to a surface of the fiber fabric in an adhesion amount of 0.1 to 3 $g/m^2$.

Further, in the method for producing having the above characteristic according to the present invention described above, the colloidal silica has an average particle diameter of 0.01 to 1 μm. The average particle diameter is an average value calculated from particle size distribution measured by a laser diffraction/scattering-type particle size distribution measuring device.

Further, in the method for producing having the above characteristic according to the present invention, the water and oil repellent fluorine compound is a fluorocarbon resin composition.

Furthermore, in the method for producing having the above characteristic according to the present invention, the binder resin is at least one selected from the group consisting of an acrylic resin, a urethane resin, and a polyester resin.

Furthermore, a soil-resistant fiber fabric according to the present invention contains colloidal silica fixed to a surface of a fiber constituting the fiber fabric in a fixation amount of 1 to 6 $g/m^2$ by a binder resin; and a water and oil repellent fluorine compound additionally adhering to the colloidal silica, in which a fluorine-based water and oil repellent group of the water and oil repellent fluorine compound is positioned in an outermost side of the fiber fabric.

Effect of the Invention

According to the present invention, a soil-resistant fiber fabric having excellent water and oil repellency and soil-dirt resistance can be provided.

BRIEF DESCRIPTION OF THE DRAWINGS

FIG. 2(*a*) is scanning electron microscope (SEM) images of a surface of a fiber fabric (Comparative Example 2) in the case in which a silica-based soil dirt preventing agent and a fluorine-based water and oil repellent agent are applied by one-time processing, and these SEM images are an overlaid mapping image (silicon and fluorine), a mapping image of only silicon and a mapping image of only fluorine in order from the left in energy dispersive X-ray spectroscopy (EDS).

Figure 1:
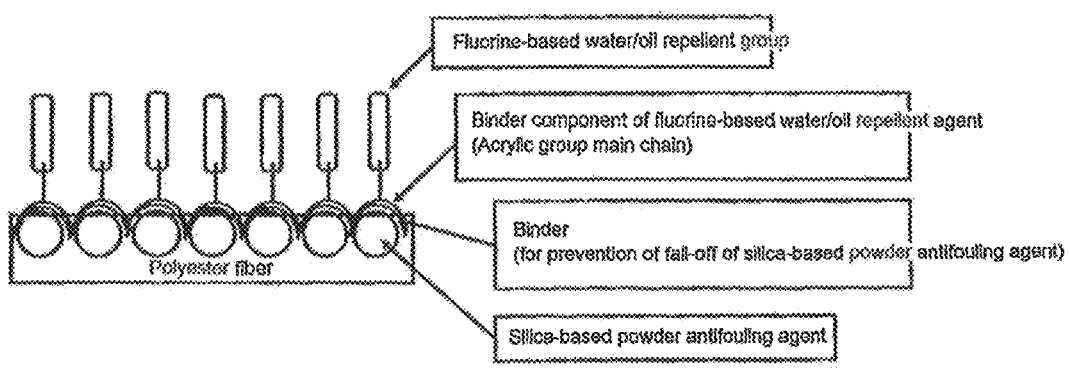
FIG. 1 is a schematic view showing a surface state of a soil-resistant fiber fabric obtained using a production method according to the present invention.

Meanwhile, FIG. 2(*b*) is SEM images of a surface of a fiber fabric (Example 1) in the case in which a silica-based soil dirt preventing agent and a binder are applied at the first time, and a fluorine-based water and oil repellent agent is applied at the second time, and these SEM images are an overlaid mapping image (silicon and fluorine), a mapping image of only silicon and a mapping image of only fluorine in order from the left in energy dispersive X-ray spectroscopy (EDS).

MODE FOR CARRYING OUT THE INVENTION

In a method for producing a soil-resistant fiber fabric according to the present invention, at a first step, colloidal silica is fixed to a fiber fabric using a binder resin in a fixation amount of 1 to 6 $g/m^2$, and more preferably 1.5 to 5.0 $g/m^2$. In this case, when the fixation amount of the colloidal silica is less than 1 $g/m^2$, soil resistance of the fiber fabric is insufficient, and when the fixation amount of the colloidal silica is more than 6 $g/m^2$, texture of the fiber fabric becomes hard, which is not preferable. The colloidal silica according to the present invention has a function of simply removing powder dirt such as sand and mud when the colloidal silica is fixed to a surface of fiber constituting the fiber fabric (that is, a function of preventing soil dirt), and it is preferable that the colloidal silica as described above has an average particle diameter of 0.01 to 1 μm. Further, in the present invention, as the colloidal silica as described above, a colloidal solution in which water is used as a dispersion medium and fine particles of $SiO_2$ or its hydrates are dispersed in water can be used.

As the binder resin for fixing the colloidal silica to the fiber fabric, at least one selected from the group consisting of an acrylic resin, a urethane resin, and a polyester resin is preferably used, and an application amount of the binder resin to the fiber fabric is within a range of preferably 0.1 to 3 $g/m^2$, and more preferably 0.5 to 2 $g/m^2$ (dry, weight). In the present invention, a concentration of the binder resin in the mixed solution is preferably 1 to 5.5 wt %. In the present invention, although a method for applying the mixed solution containing the colloidal silica and the binder resin to the fiber fabric is not limited, a dipping method is generally used, and after performing the dipping, heating and drying are performed. Further, a material of the fiber fabric used in the production method of the present invention is not particularly limited, but a fiber fabric made of a polyester fiber, a nylon fiber, air acrylic fiber, a polyurethane fiber or the like can be used.

Further, in the present invention, in a subsequent step, a water and oil repellent fluorine compound is adhered to a surface of the fiber fabric to which the colloidal silica is fixed in an adhesion amount of preferably 0.1 to 3 $g/m^2$, and more preferably 0.2 to 2.5 $g/m^2$. At that time, as the water and oil repellent fluorine compound, at least one kind of known fluorine-based water and oil repellent agent can be used, but a fluorocarbon resin composition containing two or more kinds is preferable. Particularly, in view of water repellency and safety to an environment or human body a resin having a perfluoroalkyl group with the number of carbon atoms of 6 or less in a side chain is preferable. The reason for setting the number of carbon atoms of the perfluoroalkyl group contained in a monomer, which is a structural unit of the water and oil repellent fluorine compound, to 6 or less is to prevent perfluorooctanoic acid or perfluorooctane sulfonic acid from being produced. In the present invention, a coating method at the time of applying the water and oil repellent fluorine compound is not limited, but a dipping method is generally used, and after performing the dipping, heating and drying are performed.

A soil-resistant fiber fabric according to the present invention produced by the above-mentioned steps has a configuration in which a colloidal silica is fixed to a surface of a fiber constituting the fabric using a binder resin, and a fluorine-based water and oil repellent agent is adhered to an outside thereof, and a fluorine-based water and oil repellent group of the fluorine-based water and oil repellent agent is positioned in an outermost side of the fiber fabric. FIG. 1 is a schematic view showing a surface state of a soil-resistant fiber fabric obtained using the production method according to the present invention. In order to sufficiently exhibit a soil-resistant function (soil dirt resistance), 1 to 6 g of the colloidal silica needs to be fixed per 1 $m^2$ of the surface of the fiber in the soil-resistant fiber fabric of the present invention, and detachment of the colloidal silica is prevented by the binder resin. Further, in the present invention, the water and oil repellent fluorine compound is additionally adhered to the colloidal silica fixed to the surface of the fiber. In this case, water repellency and oil repellency are imparted by positioning the fluorine-based water and oil repellent group of the water and oil repellent fluorine compound to face the outermost side of the fabric.

In the soil-resistant fiber fabric of the present invention having the surface state shown in FIG. 1, the soil resistance (soil resistance to soil dirt) is grade 3.5 or more in judgment in accordance with the method A-1 of "Testing methods for soil resistance and soil release of textiles" in JIS L 1919, the oil repellency is grade 6 or more in judgment in accordance with AATCC Test Method-118, and the water repellency is grade 10 in a water repellent test using an ethanol aqueous solution. Hereinafter, the present invention will be described in detail by way of Examples and Comparative Examples, but the present invention is not limited to the following Examples.

EXAMPLE

Example 1

A polyester woven fabric having a lightness (L value) of 70 and a basis weight of 210 $g/m^2$ was dipped in a mixed solution of 7.0% colloidal silica (ADELITE AT-30A: nonvolatile content 30%, average particle diameter: 0.0125 μm) and 3.0% polyester binder (PLAS COAT 2880: nonvolatile content 25%), and then dried at 150° C. for 2 minutes and 30 seconds. The processed fabric obtained as described above was dipped in a mixed solution of 2.5% fluorine-based water and oil repellent agent (AsahiGuard AG-E082: nonvolatile content 20%) and 2.5% fluorine-based water and oil repellent agent (AsahiGuard AG-E904: nonvolatile content 20%), and then dried at 150° C. for 2 minutes and 30 seconds. The water repellency, oil repellency, soil dirt resistance, dirt rubbing test, hand dirt test, edible oil dirt resistance, and coffee dirt resistance of the processed fabric were confirmed.

Example 2

A polyester woven fabric having a lightness (L value) of 70 and a basis weight of 210 $g/m^2$ was dipped in a mixed solution of 3.4% colloidal silica (ADELITE AT-30A: nonvolatile content 30%) and 1.4% polyester binder (PLAS COAT Z880: nonvolatile content 25%), and then dried at 150° C. for 2 minutes and 30 seconds. The processed fabric obtained as described above was dipped in a mixed solution of 0.5% fluorine-based water and oil repellent agent (AsahiGuard AG-E082: nonvolatile content 20%) and 0.5% fluorine-based water and oil repellent agent (AsahiGuard AG-E904: nonvolatile content 20%), and then dried at 150° C. for 2 minutes and 30 seconds. The water repellency, oil repellency, soil dirt resistance, dirt rubbing test, hand dirt test, edible oil dirt resistance, and coffee dirt resistance of the processed fabric were confirmed.

Example 3

A polyester woven fabric having a lightness (L value) of 70 and a basis weight of 210 $g/m^2$ was dipped in a mixed solution of 4.5% colloidal silica (ADELITE AT-30A: nonvolatile content 30%) and 2.4% polyester binder (PLAS COAT 2880: nonvolatile content 25%), and then dried at 150° C. for 2 minutes and 30 seconds. The processed fabric obtained as described above was dipped in a mixed solution of 0.9% flourine-based water and oil repellent agent (AsahiGuard AG-E082: nonvolatile content 20%) and 0.9% fluorine-based water and oil repellent agent (AsahiGuard AG-E904: nonvolatile content 20%), and then dried at 150°

C. for 2 minutes and 30 seconds. The water repellency, oil repellency, soil dirt resistance, dirt rubbing test, hand dirt test, edible oil dirt resistance, and coffee dirt resistance of the processed fabric were confirmed.

Example 4

A polyester woven fabric having a lightness (L value) of 70 and a basis weight of 210 g/m² was dipped in a mixed solution of 9.1% colloidal silica (ADELITE AT-30A: nonvolatile content 30%) and 3.8% polyester binder (PLAS COAT Z880: nonvolatile content 25%), and then dried at 150° C. for 2 minutes and 30 seconds. The processed fabric obtained as described above was dipped in a mixed solution of 3.2% fluorine-based water and oil repellent agent (AsahiGuard AG-E082: nonvolatile content 20%) and 3.2% fluorine-based water and oil repellent agent (AsahiGuard AG-E904: nonvolatile content 20%), and then dried at 150° C. for 2 minutes and 30 seconds. The water repellency, oil repellency, soil dirt resistance, dirt rubbing test, hand dirt test, edible oil dirt resistance, and coffee dirt resistance of the processed fabric were confirmed.

Example 5

A polyester woven fabric having a lightness (L value) of 70 and a basis weight of 210 g/m² was dipped in a mixed solution of 11.3% colloidal silica (ADELITE AT-30A: nonvolatile content 30%) and 5.2% polyester binder (PLAS COAT Z880: nonvolatile content 25%), and then dried at 150° C. for 2 minutes and 30 seconds. The processed fabric obtained as described above was dipped in a mixed solution of 4.1% fluorine-based water and oil repellent agent (AsahiGuard AG-E082: nonvolatile content 20%) and 4.1% fluorine-based water and oil repellent agent (AsahiGuard AG-E904: nonvolatile content 20%), and then dried at 150° C. for 2 minutes and 30 seconds. The water repellency, oil repellency, soil dirt resistance, dirt rubbing test, hand dirt test, edible oil dirt resistance, and coffee dirt resistance of the processed fabric were confirmed.

Comparative Example 1

A polyester woven fabric having a lightness (L value) of 70 and a basis weight of 210 g/m² was dipped in a mixed solution of 2.3% alkyl silicate (BAYGARD AS: nonvolatile content 15%) and 6.7% fluorine-based water and oil repellent agent (NK guard S-0671: nonvolatile content 20%), and then dried at 150° C. for 2 minutes and 30 seconds. The water repellency oil repellency, soil dirt resistance, dirt rubbing test, hand dirt test, edible oil dirt resistance, and coffee dirt resistance of the processed fabric were confirmed.

Comparative Example 2

A polyester woven fabric having a lightness (L value) of 70 and a basis weight of 210 g/m² was dipped in a mixed solution of 23.0% alkyl silicate (BAYGARD AS: nonvolatile content 15%) and 6.7% fluorine-based water and oil repellent agent (NK guard S-0671: nonvolatile content 20%), and then dried at 150° C. for 2 minutes and 30 seconds. The water repellency; oil repellency, soil dirt resistance, dirt rubbing test, hand dirt test, edible oil dirt resistance, and coffee dirt resistance of the processed fabric were confirmed.

Comparative Example 3

A polyester woven fabric having a lightness (L value) of 70 and a basis weight of 210 g/m² was dipped in 23.0% alkyl silicate (BAYGARD AS: nonvolatile content 15%), and then dried at 150° C. for 2 minutes and 30 seconds. The processed fabric obtained as described above was dipped in 6.7% fluorine-based water and oil repellent agent (NK Guard S-0671: nonvolatile content 20%), and then dried at 150° C. for 2 minutes and 30 seconds. The water repellency, oil repellency, soil dirt resistance, dirt rubbing test, hand dirt test, edible oil dirt resistance, and coffee dirt resistance of the processed fabric were confirmed.

Comparative Example 4

The water repellency; oil repellency; soil dirt resistance, dirt rubbing test, hand dirt test, edible oil dirt resistance, and coffee dirt resistance of a polyester woven fabric having a lightness (L value) of 70 and a basis weight of 210 g/m² were confirmed.

Test methods for evaluating respective test categories of the water repellency, oil repellency; soil dirt resistance, dirt rubbing test, hand dirt test, edible oil dirt resistance, and coffee dirt resistance are as follows.

[Test Method]
1. Water repellency evaluation test (performed with reference to AATCC TM-193).

A standard test solution made of ethyl alcohol was dropped on a surface of the fabric, and whether or not the fabric was wet within 30 seconds was observed. The highest grade at which no wetting was observed on the fabric was considered to be water repellent.

TABLE 1

| Grade number | Test solution |
| --- | --- |
| 10 Grade | 100% Ethyl alcohol |
| 9 Grade | 90% Ethyl alcohol |
| 8 Grade | 80% Ethyl alcohol |
| 7 Grade | 70% Ethyl alcohol |
| 6 Grade | 60% Ethyl alcohol |
| 5 Grade | 50% Ethyl alcohol |
| 4 Grade | 40% Ethyl alcohol |
| 3 Grade | 30% Ethyl alcohol |
| 2 Grade | 20% Ethyl alcohol |
| 1 Grade | 10% Ethyl alcohol |
| 0 Grade | Less than 1 Grade |

2. Oil repellency evaluation test (performed with reference to AATCC TM-118).

Standard test solutions made of a series of selected hydrocarbons having different surface tensions were dropped on a surface of the fabric, and whether or not the fabric was wet within 30 seconds was observed. The highest grade at which no wetting was observed on the fabric was considered to be oil repellent.

TABLE 2

| Grade number | Test solution | Surface tension (25° C.) |
| --- | --- | --- |
| 8 Grade | n-heptane | 14.8 dyn/cm |
| 7 Grade | n-octane | 21.4 dyn/cm |
| 6 Grade | n-decane | 23.5 dyn/cm |
| 5 Grade | n-dodecane | 24.7 dyn/cm |
| 4 Grade | n-tetradecane | 26.4 dyn/cm |
| 3 Grade | n-hexadecane | 27.3 dyn/cm |
| 2 Grade | Kaydol 65 parts: n-hexadecane 35parts | — |
| 1 Grade | Kaydol | 31.5 dyn/cm |
| 0 Grade | Less than 1 Grade | — |

3. Soil dirt assistance test

As dirt powder, a mixture of 20 g of Kanto loam layer (JIS Z 8901 type 7), 80 g of concrete powder (JIS Z 8901 type 5), and 0.1 g of carbon black (JIS K 5107) was prepared. In a 1 L metal can, 0.5 g of this dirt powder and 10 sheets of white cotton fabric (shining No. 3) each having a size of 50 mm in width and 50 mm in length were filled and shaken well in a state in which a cap was closed, thereby preparing a contaminated fabric. In this way, the required number of contaminated fabric was prepared. One test piece having a size of 50 mm in width and 150 mm in length was taken in a horizontal direction and attached to a weight of 500 g, and the weight was reciprocated and rubbed 20 times by hand. Thereafter, the contaminated fabric of a friction element was replaced with a new contaminated fabric, and rubbed again. The friction process as described above was repeated 15 times (the number of reciprocation: a total of 300 times), and dirt powder was sucked back and forth 5 times with a vacuum cleaner from the test piece. The test piece was detached, and $\Delta E$ was measured with a spectrophotometer (manufactured by Konica Minolta Inc.). A case in which $\Delta E$ was 10 or less was regarded as a pass.

4. Dirt rubbing test (Adhesion Test)

As dirt powder, a mixture of 20 g of Kanto loam layer (JIS Z 8901 type 7), 80 g of concrete powder (JIS Z 8901 type 5), and 0.1 g of carbon black (JIS K 5107) was prepared. In a 1 L metal can, 0.5 g of this dirt powder and 10 sheets of white cotton fabric (shirting No. 3) each having a size of 50 mm in width and 50 mm in length were filled and shaken well in a state in which a cap was closed, thereby preparing a contaminated fabric. In this way, the required number of contaminated fabric was prepared. One test piece having a size of 30 mm in width and 220 mm in length was taken in a horizontal direction, attached to a fastness friction tester, and rubbed with a friction element covered with the contaminated fabric with a load of 2 N. After the friction element was reciprocated and rubbed 20 times at a speed of 30 times reciprocation/min between a region of 100 mm on a surface of the test piece, the contaminated fabric of the friction element was replaced with a new contaminated fabric, and rubbed again. The fiction process as described above was repealed 5 times (the number of reciprocation: a total of 100 times), and dirt powder was sucked with a vacuum cleaner from the test piece. Additionally the above-mentioned process (process of removing the dirt powder alter reciprocation and rubbing 100 times) was repeated 6 times (the number of reciprocation: a total of 600 times). The test piece was detached, $\Delta E$ was measured with a spectrophotometer and a change in color was judged using a Grey scale for assessing change in color (JIS L 0804). A case of grade 3.5 or higher was regarded as a pass.

(Removability Test)

A dirt adhesion site of the test piece obtained in the adhesion test was rubbed reciprocatedly 20 times with a fingertip on a white cotton fabric (shirting No. 3) having a size of 50 mm in width and 50 mm in length. $\Delta E$ was measured with a spectrophotometer and a change in color was judged using a Grey scale for assessing change in color (JIS L 0804). A case of grade 4.0 or higher was regarded as a pass.

5. Hand dirt resistance test (Adhesion Test)

A white cotton fabric (shirting No. 3) having a size of 50 mm in width and 50 mm in length was dipped in a solution in which dirt powder prepared by mixing 20 g of Kanto loam layer (JIS Z 8901 type 7), 80 g of concrete powder (JIS Z 8901 type 5), and 0.1 g of carbon black (JIS K 5107) and oleic acid were mixed at a ratio of 1:2 for 10 minutes, thereby preparing a contaminated fabric. One test piece having a size of 30 mm in width and 220 mm in length was taken in a horizontal direction, attached to a fastness friction tester, and rubbed with a friction element covered with the contaminated fabric from which moisture was lightly removed using a rag with a load of 2 N. The friction element was reciprocated and rubbed 10 times at a speed of 30 times reciprocation/min between a region of 100 mm on a surface of the test piece. The test piece was detached, and after 24 hours, a change in color was judged using a Grey scale for assessing change in color (JIS L 0804). A case of grade 3.5 or higher was regarded as a pass.

(Removability Test)

A dirt adhesion site of the test piece obtained in the adhesion test was rubbed reciprocatedly 20 times with a fingertip on a white cotton fabric (shirting No. 3) having a size of 50 mm in width and 50 mm in length. A change in color was judged using a Grey scale for assessing change in color (JIS L 0804). A case of grade 4.0 or higher was regarded as a pass.

6. Edible oil dirt resistance test (Adhesion Test)

0.1 ml of edible oil (Nissin salad oil) was sucked with a pipette and dropped on a test piece having a size of 100 mm in width and 100 mm in length, and the test piece was allowed to stand for 30 seconds. A white cotton fabric having a size of 50 mm in width and 50 mm in length and a weight of 500 g were put on the dropping portion and maintained for 30 seconds, the white cotton fabric and the weight were removed. After 24 hours, a change in color was judged using a Grey scale for assessing change in color (JIS L 0804). A case of grade 2.0 or higher was regarded as a pass.

(Removability Test)

A dirt adhesion site of the test piece obtained in the adhesion test was rubbed reciprocatedly 20 times with a fingertip on a white cotton fabric (shirting No. 3) having a size of 50 mm in width and 50 mm in length, A change in color was judged using a Grey scale for assessing change in color (JIS L 0804). A ease of grade 3.5 or higher was regarded as a pass.

7. Coffee dirt resistance test (Adhesion Test)

0.1 nil of coffee prepared by mixing 0.75 g of coffee powder and 50 ml of boiling water was sucked using a pipette and dropped on a test piece having a size of 100 mm in width and 100 mm in length, the test piece was allowed to stand for 30 seconds. A white cotton fabric having a size of 50 mm in width and 50 mm in length and a weight of 500 g were put on the dropping portion and maintained for 30 seconds, the white cotton fabric and the weight were removed. After 24 hours, a change in color was judged using a Grey scale for assessing change in color (JIS L 0804). A case of grade 4.5 or higher was regarded as a pass.

(Removability Test)

A dirt adhesion site of the test piece obtained in the adhesion test was rubbed reciprocatedly 20 times with a fingertip on a white cotton fabric (shirting No. 3) having a size of 50 mm in width and 50 mm in length, A change in color was judged using a Grey scale for assessing change in color (JIS L 0804). A case of grade 4.5 or higher was regarded as a pass.

The test evaluation results for the polyester woven fabrics of Examples 1 to 5 and Comparative Examples 1 to 4 are summarized in the following Table 3.

TABLE 3

|  | Example 1 | Example 2 | Example 3 | Example 4 | Example 5 | Comp. Ex. 1 | Comp. Ex. 2 | Comp. Ex. 3 | Comp. Ex. 4 |
|---|---|---|---|---|---|---|---|---|---|
| Fluorine-based water/oil repellent (g/m²) | 1.4 | 0.3 | 0.5 | 1.8 | 2.4 | 2.0 | 2.0 | 2.0 | — |
| Colloidal silica (g/m²) | 3.1 | 1.5 | 2.0 | 4.0 | 5.0 | — | — | — | — |
| Alkyl silicate (g/m²) | — | — | — | — | — | 0.5 | 5.0 | 5.0 | — |
| Polyester-type binder (g/m²) | 1.1 | 0.5 | 0.8 | 1.4 | 1.9 | — | — | — | — |
| Water repellency (Grade) | 10 | 10 | 10 | 10 | 10 | 10 | 9 | 6 | 0 |
| Oil repellency (Grade) | 6 | 8 | 6 | 8 | 6 | 6 | 5 | 2 | 0 |
| Soil dirt resistance ΔE | 7.9 | 8.9 | 8.1 | 7.7 | 8.3 | 10.5 | 5.5 | 6.0 | 14.3 |
| Dirt rubbing test [Adhesion] ΔE | 9.7 | 9.8 | 8.4 | 9.1 | 9.4 | 10.5 | 6.3 | 7.6 | 15.3 |
| (Grade) | 3.5 | 3.5 | 3.5 | 3.5 | 3.5 | 3.5 | 4.0 | 4.0 | 2.5 |
| Dirt rubbing test [Removal] ΔE | 6.5 | 6.8 | 5.8 | 5.5 | 8.1 | 5.5 | 5.1 | 5.5 | 10.5 |
| (Grade) | 4.0 | 4.0 | 4.0 | 4.0 | 4.0 | 4.0 | 4.0 | 4.0 | 3.5 |
| Hand dirt resistance test [Adhesion] (Grade) | 3.5 | 3.5 | 3.5 | 3.5 | 3.5 | 3.5 | 3.5 | 3.0 | 3.5 |
| Hand dirt resistance test [Removal] (Grade) | 4.5 | 4.0 | 4.0 | 4.5 | 4.5 | 3.5 | 3.5 | 3.5 | 3.5 |
| Edible oil dirt resistance [Adhesion] (Grade) | 2.0 | 2.0 | 2.0 | 2.0 | 2.0 | 1.0 | 1.0 | 1.0 | 3.0 |
| Edible oil dirt resistance [Removal] (Grade) | 4.0 | 3.5 | 3.5 | 4.0 | 4.0 | 3.0 | 2.5 | 2.0 | 3.0 |
| Coffee dirt resistance [Adhesion] (Grade) | 5.0 | 4.5 | 4.5 | 5.0 | 5.0 | 5.0 | 5.0 | 4.0 | 3.5 |
| Coffee dirt resistance [Removal] (Grade) | 5.0 | 4.5 | 4.5 | 5.0 | 5.0 | 5.0 | 5.0 | 4.0 | 3.5 |

From the test results in Table 3, the polyester woven fabrics obtained in Examples 1 to 5 (the soil-resistant fiber fabric of the present invention) and the polyester woven fabric in Comparative Example 1 had water repellency of grade 10 and oil repellency of grade 6, but all the polyester woven fabrics in Comparative Examples 2 to 4 had water repellency of grade 9 or less and oil repellency of grade 5 or less. Further, with respect to soil dirt resistance, all the polyester woven fabrics in Examples 1 to 5 and the polyester woven fabrics in Comparative Examples 2 and 3 had ΔE of 10 or less and exhibited excellent soil dirt resistance, but the soil dirt resistance (ΔE) of each of the polyester woven fabrics in Comparative Examples 1 and 4 was over 10. Furthermore, from the test results in Table 3, it was also confirmed that the polyester woven fabrics in Examples 1 to 5 were superior in edible oil dirt resistance as compared to the polyester woven fabrics in Comparative Examples 1 to 3, and even in the case in which hand dirt adhered, it was easy to remove the hand dirt.

In addition, with respect to the polyester woven fabrics in Example 1 and Comparative Example 2, adhesion states of silicon and fluorine present on the surface of the fiber fabric were investigated using a scanning electron microscope (SEM), FIG. 2(a) shows an SEM image of the surface of the polyester woven fabric (Comparative Example 2) in the case in which the dipping and drying of a mixed solution of alkyl silicate and a fluorine-based water and oil repellent agent were performed by one-time processing, and FIG. 2(b) shows an SEM Image of the surface of the polyester woven fabric (Example 1) in the case in which the dipping and drying of a mixed solution of colloidal silica and a polyester binder were performed at the first time, and the dipping and drying of a mixed solution of two kinds of fluorine-based water and oil repellent agents were performed in the second time. FIGS. 2(a) and 2(b), in order from the left, are overlaid mapping images (silicon and fluorine), mapping images of only silicon, and mapping images of only fluorine. From the comparison between the SEM images in FIGS. 2(a) and 2(b), it was not confirmed that fluorine was adhered to the surface of the fiber constituting the polyester woven fabric in Comparative Example 2, but it was confirmed that a larger amount of fluorine was adhered to the surface of the fiber constituting the polyester woven fabric in Example 1 compared with the polyester woven fabric in Comparative Example 2.

INDUSTRIAL APPLICABILITY

In the case of using the production method of the present invention, a fiber fabric having excellent soil resistance can be produced by a relatively simple process. The soil-resistant fiber fabric of the present invention produced using this method is particularly suitable as interior fabrics for vehicles, ships, aircraft and the like due to excellent soil dirt resistance and water and oil repellent function, but uses of the soil-resistant fiber fabric are not limited thereto. That is, the soil-resistant fiber fabric can be widely used.

The invention claimed is:

1. A method for producing a soil-resistant fiber fabric, the method comprising:
    fixing colloidal silica to a fiber fabric in a fixation amount of 1 to 6 g/m² using a mixed solution containing a binder resin and colloidal silica and having a concentration of the binder resin of 1.0 to 5.5 wt %, wherein an application amount of the binder resin to the fiber fabric is within a range of 0.1 to 3 g/m² (dry weight); and then
    treating the fiber fabric with a water and oil repellent fluorine compound to adhere the water and oil repellent fluorine compound to the colloidal silica fixed to a surface of the fiber fabric in an adhesion amount of 0.1 to 3 g/m², whereby a fluorine-based water and oil repellent group of the fluorine compound faces the outermost side of the fabric.

2. The method of claim 1, wherein the colloidal silica has an average particle diameter of 0.01 to 1 μm.

3. The method of claim 1, wherein the water and oil repellent fluorine compound is a fluorocarbon resin composition.

4. The method of claim 1, wherein the binder resin is at least one selected from the group consisting of an acrylic resin, a urethane resin, and a polyester resin.

* * * * *